United States Patent [19]
Aoki

[11] 4,080,544
[45] Mar. 21, 1978

[54] ELECTRIC MOTOR
[75] Inventor: Kanemasa Aoki, Yokohama, Japan
[73] Assignees: Canon Kabushiki Kaisha; Canon Seiki Kabushiki Kaisha, both of Tokyo, Japan
[21] Appl. No.: 665,179
[22] Filed: Mar. 9, 1976
[30] Foreign Application Priority Data
  Mar. 13, 1975  Japan .................................. 50/30506
  Nov. 7, 1975   Japan ................................ 50/133679
[51] Int. Cl.² ................................................ H02K 1/22
[52] U.S. Cl. .............................. 310/268; 310/40 MM;
                                              310/46; 310/154
[58] Field of Search .................... 310/268, 46, 40 MM,
            310/162–164, 114, 154, 165, 237, 266, 198,
                                                      202–208

[56]        References Cited
        U.S. PATENT DOCUMENTS
  2,853,637   9/1958   Ishikawa .............................. 310/154
  3,189,770   6/1965   Henri-Baudot ....................... 310/162
  3,320,454   5/1967   Kober .................................. 310/268
  3,348,086  10/1967   Monma ................................ 310/154
  3,469,134   9/1969   Beyersdorf .......................... 310/164
  3,500,095   3/1970   Keogh ................................. 310/268
  3,790,835   2/1974   Takeda ................................ 310/237
  3,906,622   9/1975   Sakano ................................ 310/237
  3,984,709  10/1976   Kuwako .............................. 310/154

FOREIGN PATENT DOCUMENTS
  1,124,138   2/1962   Germany ............................. 310/268
    832,452   1/1952   Germany ............................. 310/268

Primary Examiner—R. Skudy
Attorney, Agent, or Firm—Fitzpatrick, Cella, Harper & Scinto

[57]        ABSTRACT

A flattened DC motor, in which a rotary armature having a coil assembly comprising a combination of at least two disc-shaped coils, each having radial segments, is disposed in the field of a fixed field permanent magnet. The brushes are in contact with an area of a cylindrical commutator where the fixed field permanent magnet overlaps, the commutator being electrically connected to the coil assembly and secured on the rotary shaft.

10 Claims, 11 Drawing Figures

FIG. 1(a)
FIG. 1(b) PRIOR ART
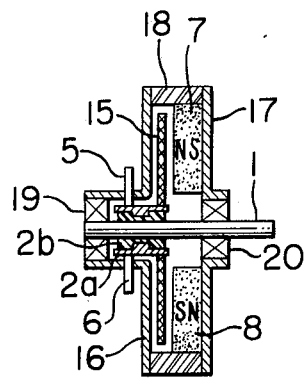
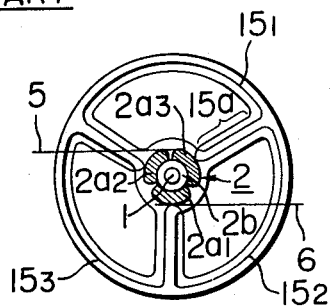
FIG. 2 PRIOR ART
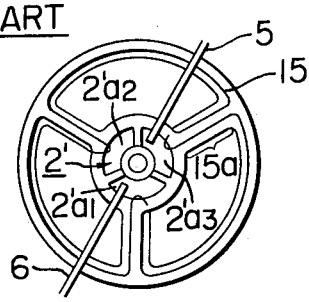
FIG. 3(a)
FIG. 3(b)
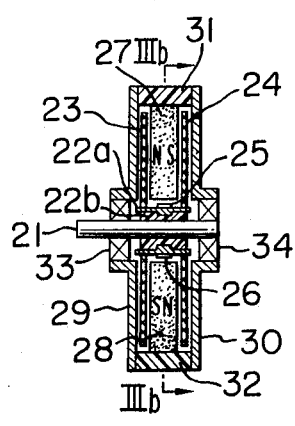
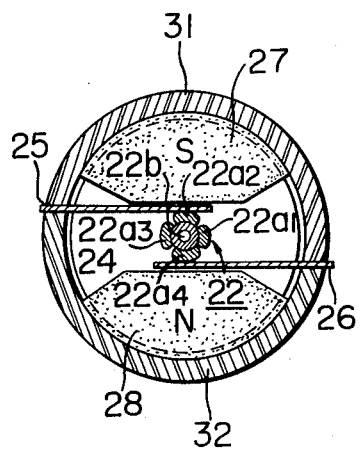

ELECTRIC MOTOR

BACKGROUND OF THE INVENTION

1. Field of the Invention

This invention relates to an electric motor, and, more particularly, it is concerned with the d.c. electric motor of a flattened shape, wherein a rotary armature including a coil assembly formed of a combination of at least two disc-shaped coils, each having radial segments, is disposed within the field of a fixed field permanent magnet, and, at the same time, brushes are in contact with an area of a cylindrical commutator electrically connected with the coil assembly and fixedly provided on the rotary shaft, at which the fixed field permanent magnet overlaps.

2. Description of the Prior Art

Increasing tendency of tape recorders and other acoustic devices toward smaller sizes has given rise to the need for smaller electric motors to be used therewith. Reduction in size of such motors may be realized either diametrally or axially thereof. In a micro-cassette tape recorder or the like, for example, flattening of the motor and making the direction of peripheral rotation of the rotary shaft coincident with the direction of tape running would be more advantageous in terms of the drive transmission mechanism.

For this reason, a number of motors of an axially flattened type have heretofore been proposed for use with tape recorders and other acoustic devices, among which there are such ones having the armature coils formed in a disc-shape to flatten the motors to the axial direction thereof. However, in the conventional electric motors of this type, a cylindrical commutator is provided on the very same rotary shaft having the disc-shaped coils disposed thereon, and, since such commutator is laterally projected with respect to the fixed fields lying on the opposite sides of the disc-shaped coils, the motor should be thicker in axial direction thereof for the projected part, so that it can be said to be the realization of the ideal flattened electric motor. To overcome the drawbacks involved in the use of such cylindrical commutator, there have also been proposed electric motors, in which the cylindrical commutator is replaced by a disc-shaped commutator. On the other hand, in a disc-shaped armature having disc-shaped coils, the radial segments of the coils produce rotational force, owing to which mere provision of a disc-shaped commutator would pose a problem such that it restricts the length of the radial segments of the coils and thus reduces the power of the motor.

SUMMARY OF THE INVENTION

It is a primary object of the present invention to provide an ideal electric motor which overcomes the above-noted problems existing in the conventional electric motors.

It is a secondary object of the present invention to provide a highly miniaturized DC motor.

It is a third object of the present invention to provide a very small, flattened DC motor, the thickness of which is extremely reduced in the axial direction.

It is a fourth object of the present invention to provide an electric motor which is very simple in its manufacturing.

It is a fifth object of the present invention to provide an electric motor capable of taking a very high permeance factor.

It is a sixth object of the present invention to provide an electric motor which is small in size but can provide very large power.

It is a seventh object of the present invention to provide an electric motor having an armature of a construction such that at least two disc-shaped coils having substantial radial segments are disposed perpendicularly with respect to the rotary shaft and in a spaced apart relationship in the direction of the rotary shaft, and a commutator is disposed on the rotary shaft between the adjacent disc-shaped coils.

It is an eighth object of the present invention to provide an electric motor provided with an armature of a construction such that at least two disc-shaped coils having substantial radial segments are closely brought together into a single coil, then the combined single coil is securely provided on the rotary shaft in a substantially perpendicular relationship thereto and in an opposed relationship with a fixed field, and at the same time, a commutator is disposed on the rotary shaft within the area of the fixed field in the axial direction of the rotary shaft.

The foregoing objects, other objects, and specific construction of the present invention will become more apparent from the following detailed description and the accompanying drawings.

BRIEF DESCRIPTION OF THE DRAWINGS

FIG. 1(a) is a longitudinal cross-sectional view of an electric motor provided with a conventional cylindrical commutator;

FIG. 1(b) is a plan view, with particular detail, illustrating the configuration of the cylindrical armature shown in FIG. 1(a);

FIG. 2 is a plan view illustrating a positional relationship between the disc-shaped armature and brushes in an electric motor provided with a conventional disc-shaped commutator;

FIG. 3(a) is a longitudinal cross-sectional view of one embodiment of the electric motor according to the present invention;

FIG. 3(b) is a cross-sectional view taken along line 111b-111b in FIG. 3(a);

DESCRIPTION OF THE PREFERRED EMBODIMENTS

Figure 4A:
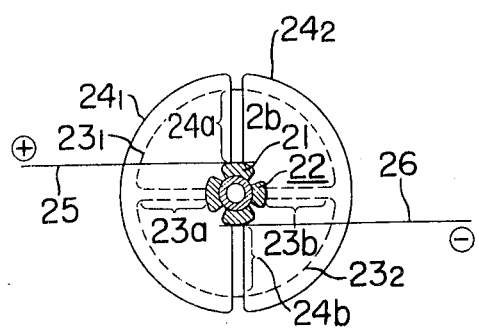
FIG. 4(a) illustrates the principle of the armature in the electric motor of FIGS. 3(a) and 3(b)

The flat electric motors of the known type and of the present invention, respectively, will hereinafter be described in detail with reference to particular embodiments thereof and in reference to the drawings.

FIG. 1(a) is a longitudinal cross-sectional view of an electric motor with a conventional cylindrical commutator, and FIG. 1(b) is a plan view particularly showing the winding configuration of a disc-shaped armature in the motor of FIG. 1(a).

The motor shown in FIGS. 1(a) and 1(b) includes a rotary shaft 1, a cylindrical commutator 2 having conductor portions 2a and an insulating portion 2b, a disc-shaped armature 15 comprising coils $15_1$, $15_2$ and $15_3$, each having radial segments 15a. The conductor portions $2a_1$, $2a_2$, $2a_3$ of the commutator and the coils $15a_1$, $15a_2$, $15a_3$ form electrically connected pairs, and the disc-shaped armature 15 and the commutator 2 are fixedly provided on the rotary shaft 1 through the insulating portion 2b. The motor further includes a cylindrical frame 18 of a non-magnetic material, both ends of which are closed by end frames 16 and 17 made of a soft magnetic material so as to form magnetic path yokes. Fixed field permanent magnets 7 and 8 are disposed within the frame in opposed relationship with the disc-shaped armature 15 and secured on the inner wall surface of the end frame 17 as by adhesive. Designated by 19 and 20 are bearing members secured to the end frames 16 and 17, respectively, to rotatably support the rotary shaft 1.

The conventional electric motor with the disc-shaped armature constructed as described above has the cylindrical commutator which protrudes laterally beyond the fixed fields lying on the opposite sides of the coil section, and which hinders flattening of the motor.

FIG. 2 shows another conventional disc-shaped armature, in which a disc-shaped commutator 2' replaces the cylindrical commutator to reduce the axial length of the electric motor shown in FIG. 1. In FIG. 2, reference numerals corresponding to those in FIG. 1 designate identical members, hence this armature can completely replace the armature in FIG. 1(a). Such electric motor using the disc-shaped commutator, as shown in FIG. 2, permits the flattening thereof, because the disc-shaped commutator 2' is disposed on the same plane as the disc 15 of coils $15_1$, $15_2$ and $15_3$. However, in the disc-shaped armature, the rotational force is produced in the direction of the radial segments 15a of the coils $15_1$, $15_2$, $15_3$, so that provision of the disc-shaped commutator 2' in this plane would inevitably limit the length of the radial segments 15a of the coils, and the power of the motor is weakened.

Figure 4B:
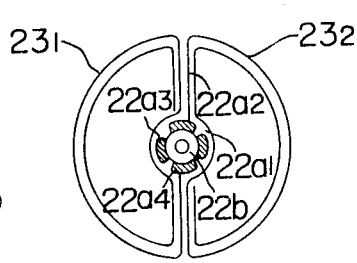
FIGS. 4(b) and (c) illustrate the constructions of the coils.
Figure 4C:
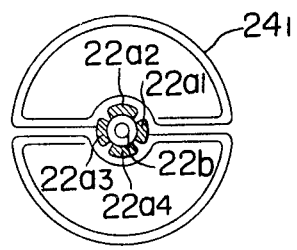
FIG. 4(d) is a longitudinal cross-section of the same armature.
Figure 4D:
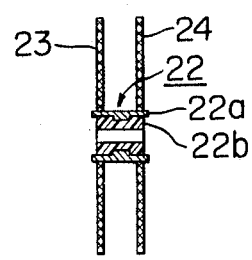

FIG. 3(a) is a longitudinal cross-sectional view showing a first embodiment of the electric motor according to the present invention, and FIG. 3(b) is a cross-section taken along line A—A in FIG. 3(a). In FIG. 3, the motor includes a rotary shaft 21, and a cylindrical commutator 22 having conductor portions $22a_1$, $22a_2$, $22a_3$ and $22a_4$ an an insulating portion 22b. Designated by 23 and 24 are disc-shaped coil assemblies which form an armature. These coil assemblies 23 and 24 respectively comprise two disc-shaped coils $23_1$, $23_2$ and $24_1$, $24_2$, each having an electrical angle of 180° as shown in FIGS. 4(b) and 4(c), which are so arranged as to producing a mutual phase difference of 90° in terms of the electrical angle as shown in FIG. 4(a), thereby forming an armature with the cylindrical commutator 22 interposed between the two coil assemblies. FIG. 4(a) shows only the armature 23, 24 and brushes 25, 26 in a cross-sectional view taken along line 111b-111b in FIG. 3(a). In FIG. 4(a), the coil assemblies 23 and 24 are not shown in an overlapped state. This is simply for the purpose of making the positional relationship of the coil assemblies 23 and 24 more readily understandable. Actually, the two coil assemblies are substantially equal in diameter, and, if the surface distribution of magnetization is constant, the armature may effect smooth and continuous rotation. Fixed field permanent magnets 27, 28 and yokes 29, 30 of a soft magnetic material are provided in pairs to form magnetic paths. Bearing members 33 and 34 are secured to the yokes 29 and 30, respectively to rotatably support the rotary shaft 21. Designated by 31 and 32 in FIG. 3(b) are curved frame members of a non-magnetic material, on the inner peripheral surface of which the permanent magnets 27 and 28 are secured as by adhesive. After the fixed field permanent magnets 27 and 28 have been interposed between the disc-shaped windings 23 and 24, the two frame members 31 and 32 may be fixed together as by adhesive so as to form a cylindrical frame with the brushes 25 and 26 held at their junctions as shown in FIG. 3(b), and the yokes 29 and 30 may be secured at both ends of the cylindrical frame.

The thus constructed electric motor according to the first embodiment of the present invention employs a combination of two disc-shaped coils with a commutator and fixed fields disposed therebetween, whereby a flat and miniaturized motor which ensures efficient utilization of the space can be provided. Also, provision of the two disc-shaped coils constituting the armature permits the diameter of the disc to be smaller for the same output as that of the motor having a single disc-shaped coil, and such arrangement leads to a reduction in size of the motor.

In the present embodiment, the armature is shown as having no iron core, but it may have an iron core. Further, the number of coils forming the first and the second discs, respectively, is not limited to two. When the number of coils included in one disc-shaped coil assembly is to be changed, the coil assembly forming an adjacent disc may be designed such that a phase difference of half the electrical angle of the respective coils may be provided. Still further, three of such discs may be used and arranged side by side in a spaced apart relationship with commutators being interposed between adjacent ones of the three discs.

Figure 5A:
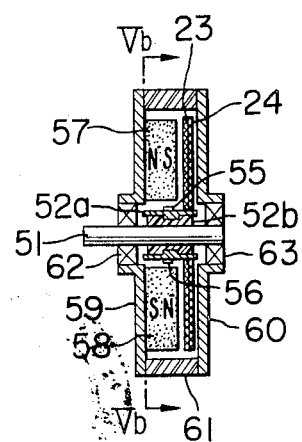
FIG. 5(a) is a longitudinal cross-sectional view showing another embodiment of the electric motor according to the present invention.
Figure 5B:
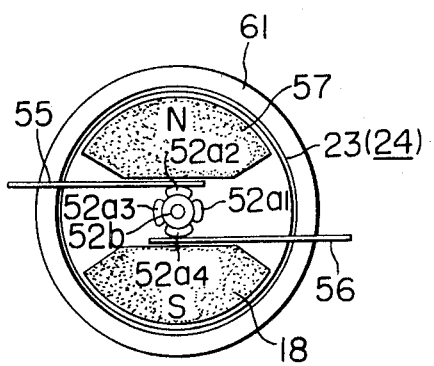
FIG. 5(b) is a cross-sectional view of the motor in FIG. 5(a) as viewed in the direction of arrows Vb-Vb in FIG. 5(a), with a yoke 59 being removed.

FIGS. 5(a) and 5(b) show a second embodiment of the electric motor according to the present invention, which is an improvement over the embodiment of FIG. 4.

Although the electric motor according to the first embodiment of the present invention shown in FIGS. 3(a) to 4(d) is more flattened than the conventional motor of FIG. 1, and can be made smaller than the conventional motor of FIG. 2 with an equal degree of output power being produced by the latter, the axially spaced apart arrangement of the disc-shaped coil assemblies 23 and 24 with the fixed field permanent magnets 27 and 28 interposed therebetween requires two layers of clearance per disc-shaped coil assembly, hence four layers of clearance in all. Such construction is disadvantageous in taking a high permeance factor. Moreover, for the permanent magnets 27 and 28 to be interposed between the disc-shaped coil assemblies 23 and 24, the frame should be separable into two, which leaves problems at the time of its assembly and the structural rigidity of the electric motor.

In view of this, the electric motor according to the second embodiment of the present invention shown in FIGS. 5(a) and 5(b) is provided with an armature of a construction such that at least two disc-shaped coils having substantial radial segments are closely brought together to form a single disc, then such combined single disc is fixedly provided on the rotary shaft in a perpendicular relationship thereto, and in an opposed relationship with the fixed fields, and a commutator is disposed on the rotary shaft within the area of the fixed fields with axial direction of the rotary shaft. Thus, the present embodiment provides an electric motor which is simple in its manufacturing, can take a high permeance factor, and produce a large output power for the smallness in size. This second embodiment of the present invention will hereinafter be described in reference to FIGS. 5(a) and 5(b).

FIG. 5(a) is a longitudinal cross-sectional view of the electric motor according to the second embodiment of the present invention, and FIG. 5(b) is a cross-sectional view of such motor taken along line A—A in FIG. 5(a), with a yoke 59 being removed.

In FIGS. 5(a) and (b), the rotary shaft is designated by 51 and the cylindrical commutator 52 comprises conductor portions 52a and an insulating portion 52b. Disc-shaped coil assemblies 23 and 24 similar to those shown in FIGS. 4(a) and (b) are mutually displaced in a positional relationship to produce a phase difference of 90° and closely brought together so as to form a single coil assembly. The coils $23_1$, $23_2$, and $24_1$, $24_2$ of the respective coil assemblies and the conductor portions $52_1$, $52_2$, $52_3$ and $52_4$ of the commutator are electrically connected together in pairs. There are further provided brushes 55 and 56, a cylindrical framework 61 of a nonmagnetic material, yokes 59 and 60 formed of a soft magnetic material, and disposed on the opposite end faces of the framework 61. Fixed field permanent magnets 57 and 58 are disposed within the framework in opposed relationship with the coil assemblies 23 and 24 and fixed on the inner wall of the yoke 59 as by adhesive. Designated by 62 and 63 are bearing members fixed to the yokes 59 and 60 to rotatably support the rotary shaft 51.

Thus, the second embodiment of the present invention provides a highly flattened electric motor having an armature of a construction such that at least two disc-shaped coil assemblies 23,24 having substantial radial segments are closely brought together to form a single disc, then the combined single disc is secured on the rotary shaft 51 in a perpendicular relationship thereto and in an opposed relationship with the fixed field permanent magnets 57,58, and a commutator 52 is disposed on the rotary shaft 51 within the area of the fixed field permanet magnets 57,58 in the axial direction of the rotary shaft. This motor is simple in assembly dismantling and re-assembly, and can take a high permeance factor, and produce a large output power for the smallness in its size.

I claim:

1. A small d.c. motor, comprising in combination:
   a. a casing;
   b. a rotor extending inside said casing and including:
      1. a rotary shaft;
      2. an cylindrical insulator secured to said rotary shaft inside said casing;
      3. conductor means including a plurality of conductor members secured to said insulator and distributed about its cylindrical shape at substantially equally spaced intervals to form a cylindrical commutator or said rotary shaft;
      4. an armature including a first coil assembly in a thin disc shape, said first coil assembly comprising at least two disc-shaped coils disposed along said rotary shaft with said coils being mutually offset at an electrical angle of approximately 180° and lying in a first common plane extending substantially perpendicular to the axial direction of said commutator, and a second coil assembly also of a thin disc shape and comprising at least two disc-shaped coils disposed along said commutator with said coils being mutually offset at an electrical angle of approximately 180° and lying in a second common plane parallel to but displaced from said first plane; and the coils of the first assembly being offset by 90° with respect to the coils of the second assembly;
   c. a stator comprising at least two permanent magnet plates disposed in mutually opposed relationship on the inner peripheral surface of said casing in such a manner that each plate protrudes into a space defined by and between said first and second assemblies, with said permanent magnet plates being mutually displaced by 180°, one of said pair of permanent magnet plates being so magnetized that the surface thereof forming its south pole faces said first coil assembly while the surface thereof forming its north pole faces said second coil assembly and the other of said permanent magnet plates being so magnetized that the surface thereof forming its north pole faces said first coil assembly while the surface thereof forming its south pole faces said second coil assembly; and
   d. brushes secured to said casing in such a manner that one part thereof resiliently contacts a portion of said commutator between said first coil assembly and second assembly.

2. The electric motor according to claim 1, wherein said conductor members are arranged at least in a multiple of the sum of the number of said disc-shaped coils in said first coil assembly and the number of said disc-shaped coils in said second coil assembly, each of said plurality of conductor members being electrically connected in such a manner that it is in pair with the leading and trailing ends of said each different disc-shaped coil.

3. The electric motor according to claim 1, wherein said casing formed of a pair of curved frame members joined together to form a cylindrical frame.

4. The electric motor according to claim 3, wherein one of said pair of permanent magnet plates is secured to the inner peripheral surface of one of said curved frame members, and the other of said permanent magnet plates is fixed to the inner peripheral surface of the other of said curved frame members.

5. The electric motor according to claim 4, wherein said brushes are at least two in number, and are fixed to said casing by being held at the junctions of said first and second semi-circular curved frame members.

6. A small d.c. motor, comprising:
   a. a cylindrically shaped casing formed of first and second joined together curved frame members made of a non-magnetic material;
   b. a rotor extending inside said casing and including:
      1. a rotary shaft;
      2. an insulator secured to said rotary shaft;
      3. conductor means including a plurality of conductor members secured to said insulator and distributed about its cylindrical shape at substantially equally spaced intervals to form a cylindrical commutator on said rotary shaft; and
      4. an armature including a first coil assembly in a thin disc shape, said first coil assembly comprising two disc-shaped coils disposed along said rotary shaft with said coils being mutually offset at an electrical angle of approximately 180° and lying in a first common plane extending substantially perpendicular to the axial direction of said commutator, and a second coil assembly also of a thin disc shape and comprising two disc-shaped coils also disposed along said commutator with said coils being mutually offset at an electrical angle of approximately 180° and lying in a second common plane parallel to but displaced from the first plane and the coils of the first coil assembly being offset by 90° with respect to the coils of the second coil assembly;

c. a stator comprising:
 1. first a disc-shaped yoke plate fixed at one end of said casing and having a bearing at the center part of said yoke to support one end of said rotary shaft in a rotatable manner;
 2. second disc-shaped yoke plate fixed at the other end of said casing and having a bearing at the center part of said yoke to support the other end of said rotary shaft in a rotatable manner;
 3. a pair of permanent magnet plates, one of which is disposed on the inner peripheral surface of said first curved frame member, and the other of which is disposed on the inner peripheral surface of said second curved frame member, with said magnet plates being arranged in a mutually opposed relationship and in such a manner that each of said plates protrudes into a space defined by and between said first and second coil assemblies with said first and second permanent magnet plates being mutually displaced by approximately 180°, one of said pair of permanent magnet plates being secured to said first semi-circular case and being so magnetized that the surface thereof defining its south pole faces said first coil assembly while the surface thereof defining its north pole faces said second coil assembly and the other permanent magnet plate being secured to said second semi-circular case and being so magnetized that the surface thereof defining its north pole faces said first coil assembly while the surface thereof defining its south pole faces said second coil assembly; and d. a pair of brushes fixed to said casing in such a manner that one part of each brush resiliently contacts a portion of said commutator between said first coil assembly and said second coil assembly, each of said brushes being secured to said casing by being held at a junction of said first and second curved frame members, with said brushes being held at mutually opposed junctions.

7. A small d.c. motor, comprising:
a. a rotor including:
 1. a rotary shaft;
 2. an insulator secured to said rotary shaft;
 3. conductor means including a plurality of conductor members secured to said insulator and distributed about its cylindrical shape, at substantially equally spaced intervals to form a cylindrical commutator on said rotary shaft;
 4. an armature including a first coil assembly of a thin disc shape, said first coil assembly comprising at least two disc-shaped coils disposed along said rotary shaft with said coils being mutually offset at an electrical angle of approximately 180° and lying a first common plane extending substantially perpendicular to the axial direction of said commutator, and a second coil assembly also of a thin disc shape and comprising at least two disc-shaped coils also disposed along said commutator with said coils being mutually offset at an electrical angle of approximately 180° with the coils of the first coil assembly being offset 90° with respect to the coils of the second coil assembly, said coil assemblies being disposed along said commutator;

b. a stator comprising:
 1. a cylindrical casing made of a soft magnetic material;
 2. at least a pair of permanent magnet plates having inner wall spacings thereof at both ends thereof in the axial direction of said casing which are substantially equal to the axial length of said commutator, said permanent magnet plates being arranged to protrude from the inner surface of one end wall of said casing up to a position adjacent to said armature, said permanent magnet plate being in a positional relationship such that each extends over approximately 180° on the inner surface of said one end wall of said casing nearer to the other end of said commutator opposite to one end thereof where said armature is disposed, one of said pair of permanent magnet plates being so magnetized that the surface thereof facing said armature is a north pole, and the other of said permanent magnet plates being so magnetized that the surface thereof facing said armature is a south pole; and c. brushes secured to said casing in such a manner that a part thereof resiliently contacts said commutator.

8. The electric motor according to claim 7, wherein said casing is formed of a pair of curved frame members joined together to form a cylindrical frame.

9. The electric motor according to claim 8, wherein one of said pair of permanent magnet plates is secured to one of said curved frame members and the other is secured the other of said curved frame members.

10. The electric motor according to claim 9, wherein said brushes are at least two in number, and are fixed to said casing by being held at the junctions of said first and second semi-circular curved frame members.

* * * * *